United States Patent [19]

Darwood et al.

[11] 4,408,399

[45] Oct. 11, 1983

[54] WHEEL ALIGNMENT GAUGE

[75] Inventors: Phillip I. Darwood; Ernest Holland, both of Daventry; Peter M. Taylor, Flore; Christopher Marley, Hardingstone, all of England

[73] Assignee: V. L. Churchill Limited, Daventry, England

[21] Appl. No.: 323,286

[22] Filed: Nov. 20, 1981

[30] Foreign Application Priority Data

Nov. 22, 1980 [GB] United Kingdom ................. 8037526

[51] Int. Cl.³ ............................................ G01B 5/255
[52] U.S. Cl. .................................................. 33/203.18
[58] Field of Search ................ 33/203, 203.12, 203.13, 33/203.14, 203.18, 203.19, 203.2, 203.21

[56] References Cited

U.S. PATENT DOCUMENTS

| 2,522,916 | 9/1950 | Zeigler | 33/203.2 |
|---|---|---|---|
| 3,181,248 | 5/1965 | Manlove | 33/203 |
| 3,188,747 | 6/1965 | Race | 33/203.12 |
| 3,426,438 | 2/1969 | Wilkerson | 33/203.18 |
| 3,443,318 | 5/1969 | MacMillan | 33/203.18 |
| 3,488,857 | 1/1970 | Bateman | 33/203.18 |

Primary Examiner—Richard R. Stearns
Attorney, Agent, or Firm—Kemon & Estrabook

[57] ABSTRACT

A wheel alignment gauge comprising a pair of beams, each adapted to be mounted on or located against a different one of a pair of vehicle wheels or axles for such wheels, each of the beams is provided with a pivoted arm at an end of the beam which projects beyond the outer circumference of the wheel and the arms are interconnected by an elastic link, each of said arms is provided with read-out means to give an indication of the angular position of the arm relative to the beams, and thereby of the angular mis-alignment (toe angle) between the plane of rotation of the vehicle wheels or plane of rotation about the axles for the wheels; the read-out means being adjustable relative to the associated pivoted arm in order to allow for the steering angle at which the "toe out on turns" of the wheel is measured and provide an accurate direct reading gauge.

6 Claims, 6 Drawing Figures

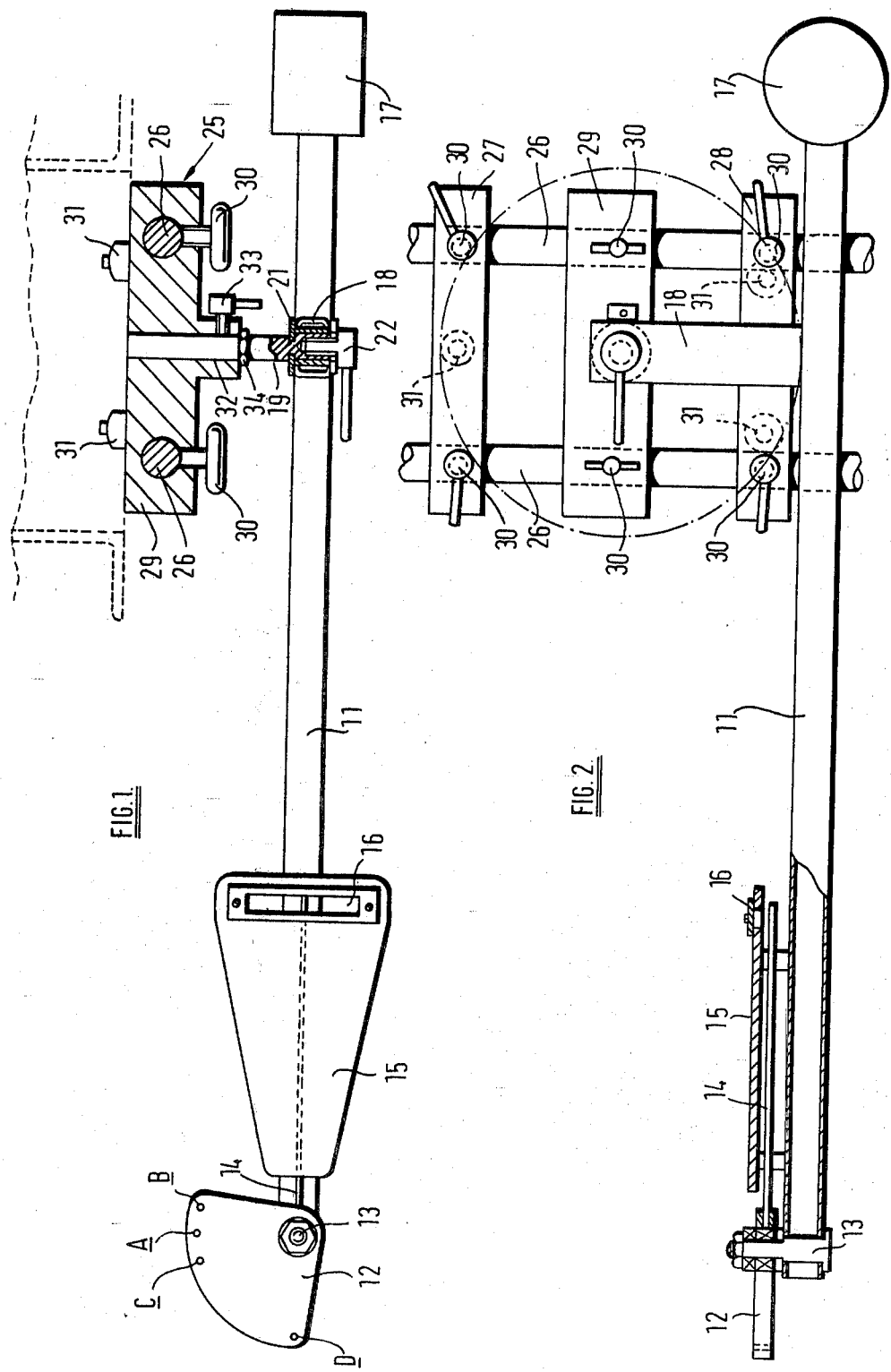

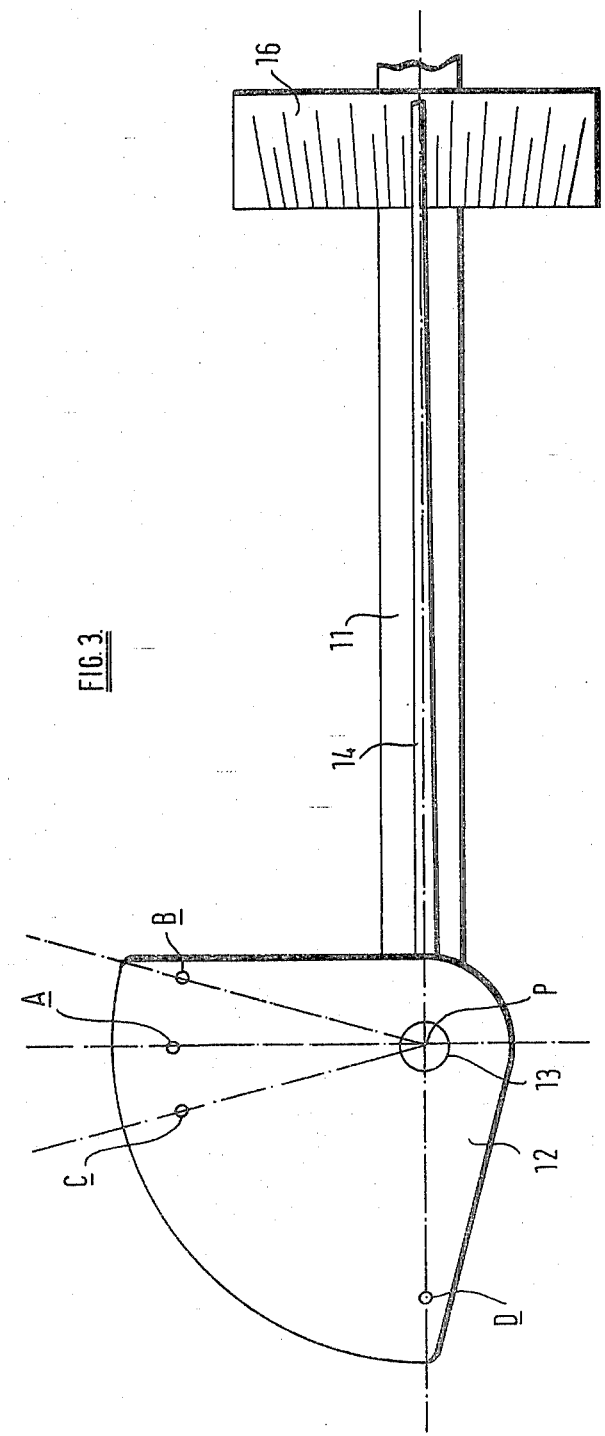

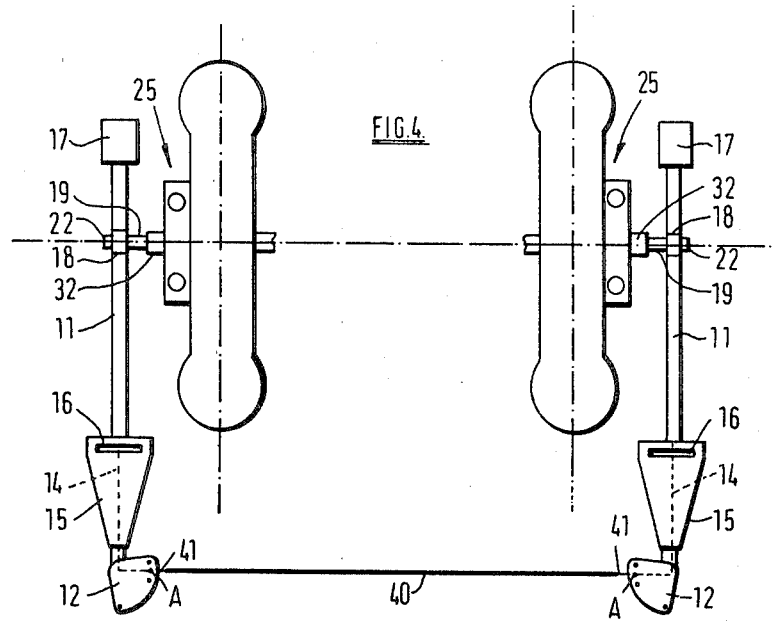
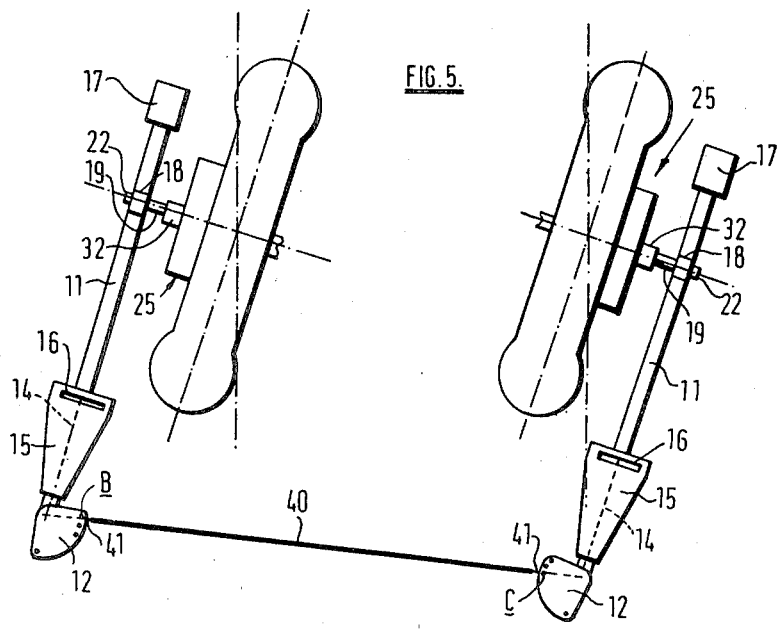

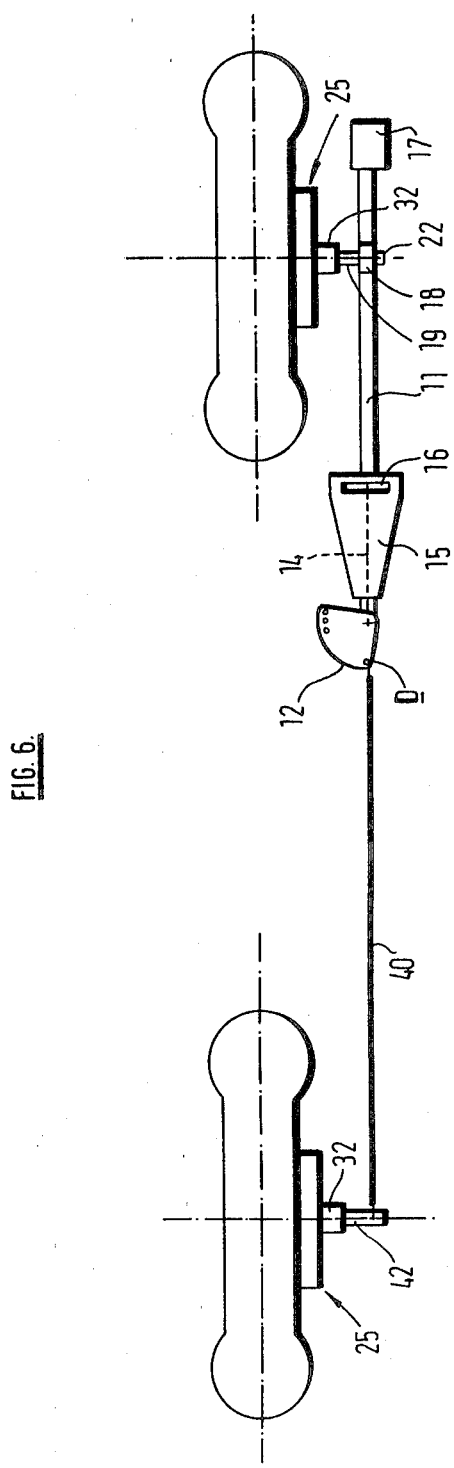

WHEEL ALIGNMENT GAUGE

The invention relates to a gauge for use in the alignment of vehicle wheels and in particular for measuring the "toe in" or "toe out" of the vehicle wheels, both when the wheels are in the dead-ahead position, i.e. the position for steering the vehicle in a straight line and when the wheels are at a steering angle ("toe out on turns"), i.e. during cornering.

According to the present invention, a wheel alignment gauge comprises a pair of beams, each adapted to be mounted on or located against a different one of a pair of vehicle wheels or axles for such wheels, each of the beams is provided with a pivoted arm at an end of the beam which projects beyond the outer circumference of the wheel and the arms are interconnected by an elastic link, each of said arms is provided with read-out means to give an indication of the angular position of the arm relative to the beam, and thereby of the angular mis-alignment ("toe angle") between the plane of rotation of the vehicle wheels or plane of rotation about the axles for the wheels; the read-out means being adjustable relative to its associated arm between a central position and a position displaced to one side of the central position by an angle $\theta$ which corresponds to the steering angle at which the "toe out on turns" of the vehicle wheels is to be measured.

The read-out means associated with each of the arms is preferably mechanical, comprising a pointer attached to the arm said pointer sweeping a scale which is calibrated to give an indication of the angular position of the arm. The wheel alignment gauge thus provided, may be used to measure both the "toe in" or "toe out" when the vehicle wheels are in the dead-ahead position and also the "toe out on turns" to both right and left, with a scale calibrated to cover the range of toe measurements likely to be experienced, for example 10° either side of the central position, without having to extend the scale to include also the angle $\theta$ which corresponds to the angle at which the "toe out on turns" is measured. This enables the length of the pointer and scale to be of sufficient size to give adequate resolution, whilst maintaining a compact and manageable arrangement. Furthermore, the pointer will give a direct read-out of the "toe angle", for each measurement. In order to improve the resolution even further the scale of the gauge may be provided with a magnifying lens.

In conventional vehicles the steering axis lies away from and is inclined to the plane of rotation of the vehicle wheels. As a result, when the wheels are rotated about the steering axis, they do not merely rotate on the spot, they also move back and forth and change angle. As a result of this complex movement, the change in angle measured on the aligment gauge is not equal to the change in the steering angle and it is found that an angle of 14.2° on the gauge corresponds to a steering angle 20°±1° on all vehicles with conventional forms of steering geometry.

In addition to measuring the "toe in" or "toe out" of either the front or rear wheels of the vehicle, by providing an additional position of the pointer with respect to the arm, in which position the pointer is displaced 90° from its central position, the gauge may be used to measure the mis-alignment between the front and rear wheels (crab) of the vehicle.

An embodiment of the present invention is now described, by way of example only, with reference to the accompanying drawings in which:

FIG. 1 shows a part sectional plan view of part of a wheel alignment gauge according to the present invention, fitted to one side of a pair of vehicle wheels;

FIG. 2 shows a part sectional side elevation of the part of the gauge illustrated in FIG. 1;

FIG. 3 shows an enlarged plan view of the pivoted arm/pointer arrangement used in the gauge shown in FIG. 1;

FIG. 4 shows a diagramatic illustration of the use of the wheel alignment gauge, illustrated in the preceding figures, to measure the "toe angle" of a pair of wheels, in the dead-ahead position;

FIG. 5 illustrates diagramatically the use of the wheel alignment gauge, illustrated in FIGS. 1 to 3, to measure the "toe angle" of a pair of vehicle wheels when turned to the right; and FIG. 6 illustrates diagramatically the use of the wheel alignment gauge, illustrated in FIGS. 1 to 3, to measure the alignment (crab) between a front and rear wheel of a vehicle, (left hand side only shown).

FIGS. 1 to 3 of the accompanying drawings show only one side of the wheel alignment gauge, the other side will be of identican construction, but of opposite hand. As illustrated in FIGS. 1 and 2, each side of the wheel alignment gauge comprises a beam 11, at one end of which a balanced sectoral arm 12 is mounted for free rotation about a pivot 13. A pointer 14 is attached to the sectoral arm 12 and a cover plate 15, secured to the beam 11 and over-lying the pointer 14, carries a scale 16 which is calibrated in degrees, so that the rotation of the sectoral arm 12 from a central position, can be determined. Conveniently the scale 16 may be calibrated for 10° either side of the central (or zero) position. The scale may be adjustable on the cover plate 15, so that the pointer may be zeroed, for calibration purposes, alternatively the pointer may be bent to bring it to the zero point. A magnifying lens (not shown) overlies the scale 16.

A drop arm 18 is provided part way along the beam 11 and extends upwardly from the face of the beam 11 to which the sectoral arm 12 and cover plate 15 are attached. At the upper end of the drop arm 18, a bush is provided in which is rotatably mounted an arbor 19. A circlip 21 mounted on the arbor 19 locates the arbor 19 longitudinally with respect to the bush and a locking screw 22 is provided at the other side of the bush, by means of which the arbor may be locked with respect to the drop arm 18. A counter weight 17 is provided at the end of the beam 11 remote from the sectoral arm 12, so that when the beam 11 is supported on the arbor 19, it will extend substantially horizontally and the sectoral arm 12 will rotate in the horizontal plane.

In use, the beam 11 is supported by arbor 19, on one of a pair of vehicle wheels, by means of a wheel clamp 25. The wheel clamp 25 illustrated is for universal application and is adjustable to allow for different sizes of wheels. The wheel clamp comprises a pair of rods 26 upon which are slidably mounted three blocks 27, 28 and 29. Clamping screws 30 are provided on each block so that it may be locked with respect to the rods 26. The upper block 27 is provided with a single centrally positioned clamping point 31 and the lower block 28 is provided with a pair of clamping points 31, these clamping points 31 are adapted to engage the rim of the wheel. To secure the wheel clamp 25 to the wheel, the blocks 27 and 28 are adjusted on rods 26 until the clamping points 31 engage the rim of the wheel. The blocks 27 and 28 are then locked in position by means of clamping screws 30. The central block 29 which carries a bush 32 into which may be mounted the arbor 19, is then positioned on the rods 26, so that the bush 32 is substantially aligned with the axle of the wheel and is then clamped in this position by means of locking screws 30. The arbor 19 may then be located in the bush 32, as far as circlip 34, which is mounted on the arbor and may be locked in this position by clamping screw 33.

As illustrated more clearly in FIG. 3, the sectoral arm 12 is provided with a hole A at its periphery, the hole A being positioned so that the line joining hole A to the pivot point P is at right angles to the axis of the pointer 14 and the line through hole A and pivot point P is parallel to the axis of the arbor 19 when the pointer 14 is on the zero or central position of the scale 16. Additional holes B and C are provided at the periphery of the sectoral arm 12 positioned 14.2° to either side of the hole A. A further hole D is positioned at the periphery of the sectoral arm 12 at an angle of 180° to the axis of the pointer 14. These holes A, B, C and D provide location means for the ends of an elastic link 40.

When measuring the "toe angle" of a pair of vehicle wheels, the vehicle should be on a substantially flat surface. Furthermore in order to measure the "toe out on turns" of the front or steering wheels of the vehicle, these wheels should be freely rotatable about the wheel steering axes of the vehicle and should also be free to move in the fore and aft and side to side directions. For this purpose the steering wheels of the vehicle are normally mounted on turntables which permit free rotation and movement in the required directions. This is normally achieved by mounting the turntable on a ball bearing which is free to rotate and also move in x and y coordinates.

In order to measure the "toe angle" of a front pair of vehicle wheels in the dead-ahead position, the wheel clamps 25 and beams 11 of the wheel alignment gauge are clamped to each of the wheels in the manner described above, and as illustrated in FIG. 4.

The two sectoral arms 12 of the wheel alignment gauge are inter-connected by means of a tensioned butyl rubber cord 40, stainless steel hooks 41, which are provided at each end of the butyl rubber cord 40, being engaged in the holes A in each of the sectoral arms 12. The wheel clamp 25 described above, is designed so that when attached to the rim of a wheel, the axis of the bush 34 will be parallel to the wheel axle and thus the beam 11 will extend horizontally in a plane parallel to the plane of rotation of the wheel. If the wheel has been damaged, the rim may be distorted so that the axis of the bush 34 is not parallel to the axis of the wheel axle. In order to allow for such distortion, the locking screw 22 is released, so that the beam 11 is freely rotatable on the arbor 19. The wheel is then rotated and any mis-alignment between the axis of the bush 34 and wheel axle will show up as a sinusiodal movement of the pointer 14. As the wheel is rotated, the maximum deflection of the pointer 14 to each side is noted, the wheel is then positioned so that the pointer 14 is mid-way between these positions. Alternatively the wheel may be rotated until the pointer 14 is at a maximum deflection and then rotated a further 90°. In this position the beam 11 is locked with respect to the arbor 19 by means of locking screw 22. In order to provide for rotation of the wheels for this purpose, a pair of rollers onto which the wheels may be mounted, may be provided on each of the turntables, one of these rollers being provided with a drive means, by means of which it may be rotated to rotate the wheels.

After adjusting each side of the alignment gauge in the manner described above, the "toe angle" of the wheels may be found directly by summing the deflections indicated on the scale 16 on either side of the gauge. For example if the wheels are in alignment, the angles between the butyl rubber cord 40 and the pointers 14 of each side of the alignment gauge should be 180°, the pointers 14 will consequently both be on zero or deflected by an equal angle to the same side of the zero position. If however one pointer 14 reads 3° "toe in" and the other pointer 14 reads 2° "toe in", the "toe angle" will be 5°. Alternatively the position of the wheels may be adjusted, by rotating them until the pointer 14 at one side is at the zero position on the scale 16, the reading on the other side will then be the "toe angle" of the wheels. The "toe angle" of the rear wheels may also be measured in a similar manner.

To measure the "toe angle on turns" to the right, as illustrated in FIG. 5, the wheel alignment gauge is mounted to the wheels and the correction for distortion of the wheel rims is carried out as described above. The hook 41 connecting the butyl rubber cord 40 to the sectoral arm 12 associated with the inside (right) wheel, is then moved from hole A to hole B and the hook 41 connecting the sectoral arm 12 associated with the outside (left) wheel, is moved from hole A to hole C. The wheels are then rotated to the right, until one of the pointers 14 is at the zero position on the scale 16, the deflection indicated by the other pointer 14 will then give the "toe angle" of the wheels, at a steering angle of 20°±1°. The "toe out on turns" to the left, may be measured by the same procedure, in which case the inside wheel will be on the left and the outside wheel on the right, and the connecting points of the butyl rubber cord 40 to the sectoral arms 12 will be reversed.

In the wheel alignment gauge described above, the spacing of the arm 11 from the wheel is accurately controlled by means of the circlips 21 and 34 and the positioning of the clamping points 31. The wheel alignment gauge may consequently be used to measure the alignment (crab) between the front and rear wheels of a vehicle, as indicated in FIG. 6. In order to measure the crab, the beams 11 of the wheel alignment gauge are attached to the rear wheels, in the manner described above, with the ends of the beams 11 to which the sectoral arms 12 are attached extending towards the front of the vehicle as illustrated in FIG. 6. An anchoring pin 42 is attached to each of the front wheels, using wheel clamps similar to those used for mounting the beams 11. Butyl rubber cords 40 are stretched between the anchoring pin 42 and hole D of the sectoral arm 12 on each side of the vehicle and the misalignment between the front and rear wheels on each side may be indicated on the scales 16 by pointers 14.

The wheel alignment gauge described above, which is of relatively simple construction, thus provides a versatile, direct reading instrument.

Various modifications may be made, without departing from the invention. For example, while in the embodiment described above, the gauge is clamped to the rims of the wheels, the gauge may alternatively be clamped direct to the wheel axles using the wheel studs. Furthermore means may be provided on the wheel clamp 25 to provide for adjustment of the axis of the bush 34 with respect to the axle, in order to correct for distortion of the vehicle wheel, for example the bush 34 may be provided on a separate plate, the plane of this plate being adjustable with respect to the plane of block 29 of the wheel clamp 25, by screw means. The elastic link used in the present invention may alternatively be a rod, for example a telescopic rod with tension or compression spring between the elements. It should be noted however that the connection between the elastic link and the sectoral arms 12, and the pivot points of the sectoral arms 12, should provide minimal frictional resistance to rotation of these components.

Although in the above description, the "toe out on turns" is measured at 20°, the gauge may be adapted to measure the "toe out" at any steering angle, by positioning the holes B and C on the sectoral arm 12 at an angle $\theta$ which corresponds to the required steering angle, on either side of the hole A.

We claim:

1. A wheel alignment gauge comprising a pair of beams; means for mounting said beams on or against a different one of a pair of vehicle wheels or axles for such wheels, such that one end of each beam extends beyond the outer circumference of the wheel; each beam has an arm which is pivotally mounted at the end thereof which extends beyond the circumference of the wheel, each of said arms having a pointer which sweeps a scale calibrated to give an indication of the angular position of the arm with respect to the beam; each arm is provided with means by which it may be connected to the other arm with an elastic link, said means being adjustable between: a central position in which the line of action of the elastic link through the pivot point of each arm will be parallel to the axis of rotation of the vehicle wheels, when the pointer is on the zero point of the scale; and a position displaced to one side of said central position, such that the line of action of the elastic link through the pivot point subtends a pre-determined angle $\theta$ to the line of action to the elastic link when in its central position, the angle $\theta$ corresponding to the steering angle at which "toe out on turns" of the vehicle wheels may be measured.

2. A wheel alignment gauge as claimed in claim 1 in which the scale is calibrated for 10° either side of the central or zero position.

3. A wheel alignment gauge according to claim 1 in which the pivoted arm is sectoral, said sectoral arm having a first location means by which the end of the elastic link may be attached to the arm in a freely pivotal manner, said first location means being positioned relative to the pivot point of the arm, so that the line joining the pivot point to the point of attachment of the elastic link, will be parallel to the axis of rotation of the wheel when the pointer is on the zero or central position of the scale; second and third location means are provided on the periphery of the sectoral arm, either side of the first location means, these second and third location means being positioned relative to the first location means, so that the angle $\theta$ subtended therebetween, at the pivot point of the sectoral arm, will correspond to the angle at which the "toe out on turns" of the vehicle wheels is to be measured.

4. A wheel alignment gauge according to claim 3 in which the second and third location means are positioned 14.2° either side of the first location means.

5. A wheel alignment gauge according to claim 3 in which a fourth location means is provided on the periphery of the sectoral arm, this fourth location means being positioned so that the angles subtended at the pivot of the sectoral arm by the points of attachment of the elastic link to the first and fourth location means is 90°.

6. A wheel alignment gauge according to claim 3 in which the location means comprise holes in the periphery of the sectoral arm, hooks being provided at the ends of the elastic link to engage in said holes.

* * * * *